US012027296B2

(12) United States Patent
Tamura et al.

(10) Patent No.: US 12,027,296 B2
(45) Date of Patent: Jul. 2, 2024

(54) INDUCTOR COMPONENT

(71) Applicant: Murata Manufacturing Co., Ltd., Kyoto-fu (JP)

(72) Inventors: Toshimitsu Tamura, Nagaokakyo (JP); Tatsuya Sasaki, Nagaokakyo (JP); Shin Hasegawa, Nagaokakyo (JP); Ikuno Sugiyama, Nagaokakyo (JP); Shinya Hirai, Nagaokakyo (JP); Yuuji Igarashi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 562 days.

(21) Appl. No.: 17/320,122

(22) Filed: May 13, 2021

(65) Prior Publication Data

US 2021/0358672 A1 Nov. 18, 2021

(30) Foreign Application Priority Data

May 15, 2020 (JP) ................................ 2020-086199

(51) Int. Cl.

| | |
|---|---|
| ***H01F 17/04*** | (2006.01) |
| ***H01F 27/24*** | (2006.01) |
| ***H01F 27/32*** | (2006.01) |
| ***H01F 41/04*** | (2006.01) |

(52) U.S. Cl.

CPC ........... *H01F 27/24* (2013.01); *H01F 27/324* (2013.01); *H01F 41/04* (2013.01)

(58) Field of Classification Search

CPC ....................................................... H01F 27/24

USPC .................................................... 336/90, 221

See application file for complete search history.

(56) References Cited

U.S. PATENT DOCUMENTS

2015/0213938 A1* 7/2015 Sakaguchi .............. H01F 27/28 206/408

FOREIGN PATENT DOCUMENTS

| | | | |
|---|---|---|---|
| CN | 108735435 | A | 11/2018 |
| JP | H09-148141 | A | 6/1997 |
| JP | 2015-144237 | A | 8/2015 |
| JP | 2018-133430 | A | 8/2018 |
| JP | 2018-182227 | A | 11/2018 |
| WO | 2020/066631 | A1 | 4/2020 |

OTHER PUBLICATIONS

English translation of JP2018133430 (Year: 2018).*
English translation of JPH0969444 (Year: 1997).*

* cited by examiner

*Primary Examiner* — Ronald Hinson
(74) *Attorney, Agent, or Firm* — Studebaker & Brackett PC

(57) ABSTRACT

An inductor component includes a core having an annular shape; an insulating member that covers a portion of the core; a coil wound around the core and the insulating member; and a buffer member that is elastic. The core has a first face, a second face that crosses the first face, and a third face that faces the second face and crosses the first face. The insulating member is provided to cover the first face, a portion of the second face, and a portion of the third face. The core and the insulating member are bonded to each other with the buffer member interposed therebetween.

16 Claims, 9 Drawing Sheets

INDUCTOR COMPONENT

CROSS-REFERENCE TO RELATED APPLICATION

This application claims benefit of priority to Japanese Patent Application No. 2020-086199, filed May 15, 2020, the entire content of which is incorporated herein by reference.

BACKGROUND

Technical Field

The present disclosure relates to an inductor component.

Background Art

A known inductor component including an annular core is described in, for example, Japanese Unexamined Patent Application Publication No. 9-148141. Japanese Unexamined Patent Application Publication No. 9-148141 discloses an encased magnetic core unit 10 in which, in order to prevent a core (referred to as "magnetic core" in Japanese Unexamined Patent Application Publication No. 9-148141) that vibrates from coming into contact with a casing and generating noise, sheets 13 are disposed in a gap between a magnetic core 11 and a casing 12. The sheets 13 are composed of elastic bodies having a Young's modulus of about $1\times10^5$ N/m$^2$ to about $1\times10^9$ N/m$^2$. The sheets 13 have a sufficient volume to fix the magnetic core 11 to the casing 12.

In recent years, smaller inductor components have been developed. Since the structure of the related art is such that the entire body of the core is contained in the casing and that a coil is wound around the core and the casing, the cross-sectional area of the core is inevitably reduced. Accordingly, the inductance is also reduced.

SUMMARY

Accordingly, the present disclosure provides an inductor component in which a core is stably positioned and that has an increased inductance.

According to preferred embodiments of the present disclosure, an inductor component includes a core having an annular shape; an insulating member that covers a portion of the core; a coil wound around the core and the insulating member; and a buffer member that is elastic. The core has a first face, a second face that crosses the first face, and a third face that faces the second face and crosses the first face. The insulating member is provided to cover the first face, a portion of the second face, and a portion of the third face. The core and the insulating member are bonded to each other with the buffer member interposed therebetween.

According to the above-described embodiments, since the core and the insulating member are bonded to each other with the buffer member interposed therebetween, the core can be stably positioned. In addition, since the insulating member covers a portion of the core, the core can be formed such that the cross-sectional area thereof is greater than when the core is entirely covered by the insulating member. Accordingly, the inductance of the inductor component can be increased.

The first face and the second face that cross each other are not limited to faces that actually cross each other, and include faces arranged such that extensions thereof cross each other. This also applies to the first face and the third face that cross each other.

According to an embodiment of the inductor component, the buffer member is provided in a portion of a space between the insulating member and the core, and the space between the insulating member and the core includes a region in which the buffer member is not provided.

According to this embodiment, the region in which the buffer member is not provided, that is, a region in which the core and the buffer member are not in contact with each other, is provided. Therefore, the influence of magnetostriction on the core can be reduced.

According to an embodiment of the inductor component, the region is provided at an edge portion of the insulating member.

According to this embodiment, the material of the buffer member can be prevented from protruding from the edge portion of the insulating member. If the material of the buffer member protrudes from the edge portion, there is a possibility that the size of the assembly including the core and the insulating member will be increased. According to the embodiment, an increase in size due to the material of the buffer member can be prevented. In addition, if the material protrudes from the edge portion of the insulating member, there is a risk that the protruding material will interfere with the coil. This can also be prevented in the present embodiment.

According to an embodiment of the inductor component, the buffer member is provided only in a space between the first face and the insulating member.

According to this embodiment, the material of the buffer member can be reliably prevented from protruding from the space between the core and the insulating member.

According to an embodiment of the inductor component, the core has an oval shape when viewed in a direction of a central axis of the core. The core includes a pair of long portions that extend in a direction of a major axis and face each other in a direction of a minor axis when viewed in the direction of the central axis of the core. The core has end faces that face each other in the direction of the central axis. The buffer member is provided on at least a portion of long-portion end faces, which are portions of one of the end faces at locations at which the long portions are provided.

According to this embodiment, since the buffer member is provided on each of the long-portion end faces, the insulating member can be prevented from being separated from the core due to vibration or an impact.

According to an embodiment of the inductor component, the buffer member extends over greater than or equal to 50% and less than or equal to 100% (i.e., from 50% to 100%) of an area of each of the long-portion end faces.

According to this embodiment, the buffer member provides reliable adhesion between the insulating member and the core even when the amount thereof is less than when the buffer member is applied over the entire region of the first face of the core. Accordingly, stress applied to the core can be reduced, so that the influence of magnetostriction on the electrical characteristics can be reduced.

According to an embodiment of the inductor component, the buffer member overlaps a line connecting centers of the long portions in the direction of the major axis on at least one of the long portions when viewed in the direction of the central axis of the core.

According to this embodiment, the insulating member and the core can be more uniformly bonded to each other.

According to an embodiment of the inductor component, the inductor component further includes a bottom plate portion. The core is disposed such that the first face faces the bottom plate portion, and the insulating member and the buffer member are disposed adjacent to the bottom plate portion.

According to this embodiment, the center of gravity of the inductor component is positioned near the bottom surface of the casing, that is, near the mounting surface. Therefore, rocking movements of the inductor component can be suppressed.

According to the present disclosure, an inductor component in which a core is stably positioned and that has an increased inductance can be provided.

Other features, elements, characteristics and advantages of the present disclosure will become more apparent from the following detailed description of preferred embodiments of the present disclosure with reference to the attached drawings.

DETAILED DESCRIPTION

Figure 1:
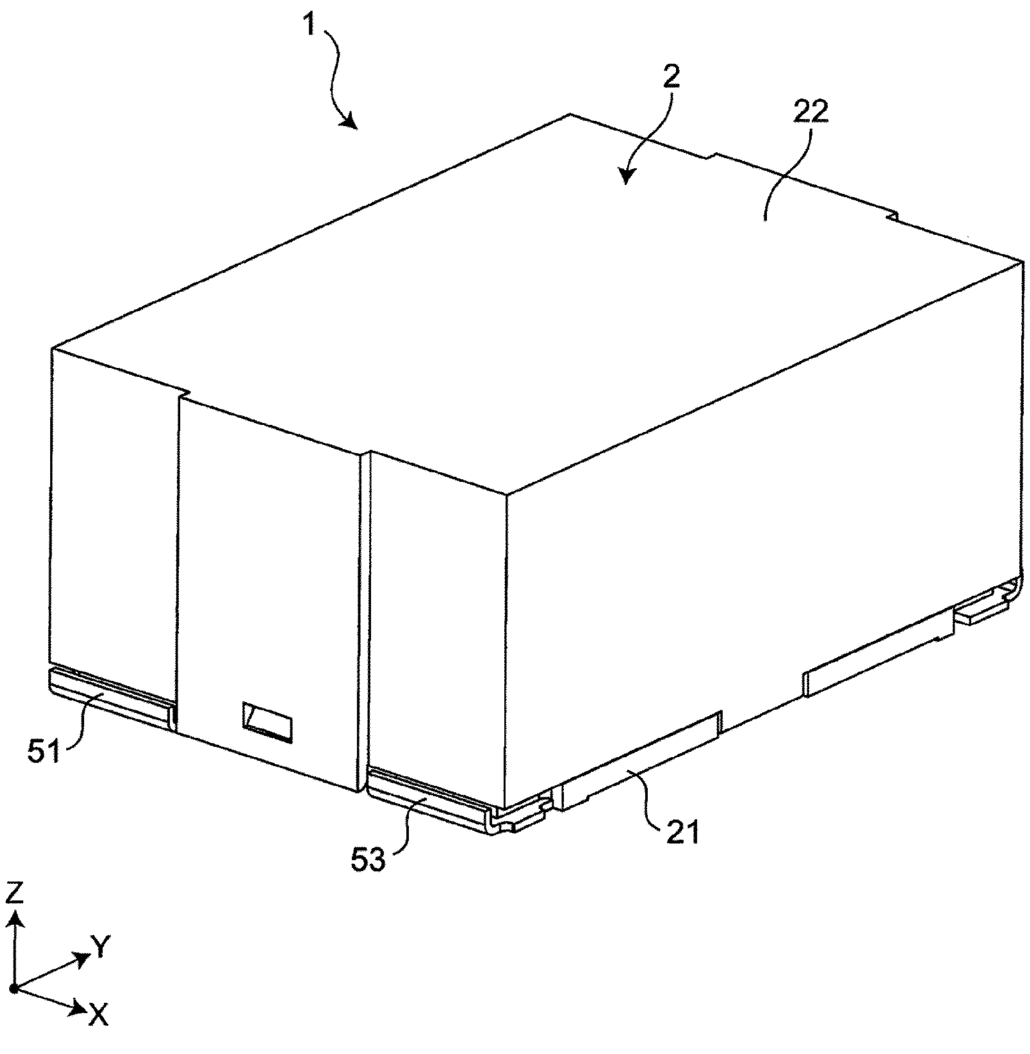
FIG. 1 is a top perspective view of an inductor component according to a first embodiment of the present disclosure.

Inductor components according to embodiments of the present disclosure illustrated in the drawings will now be described in detail below. Some of the drawings are schematic, and components may be illustrated in dimensions and ratios different from the actual ones.

First Embodiment

Figure 2:
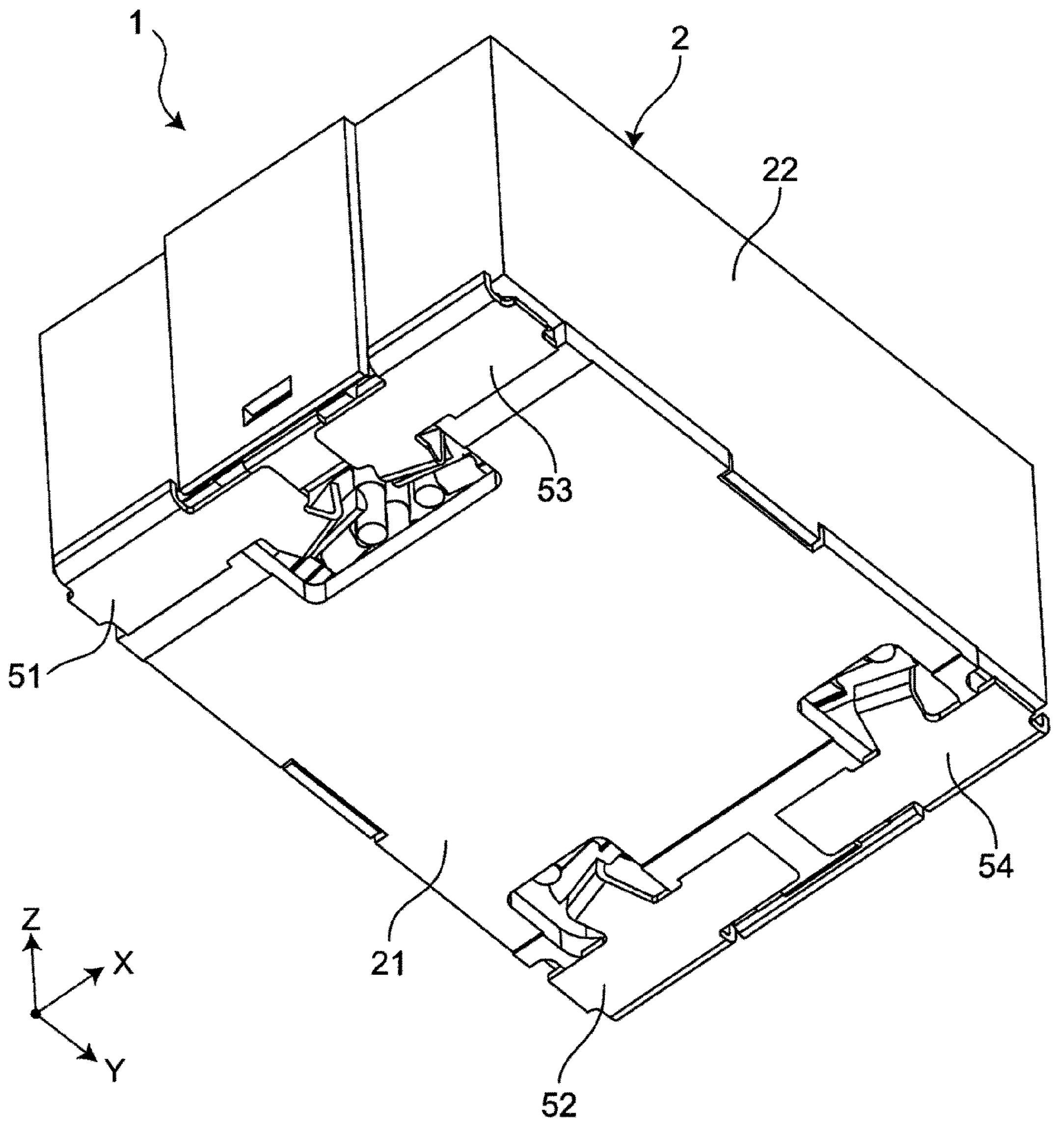
FIG. 2 is a bottom perspective view of the inductor component according to the first embodiment.
Figure 3:
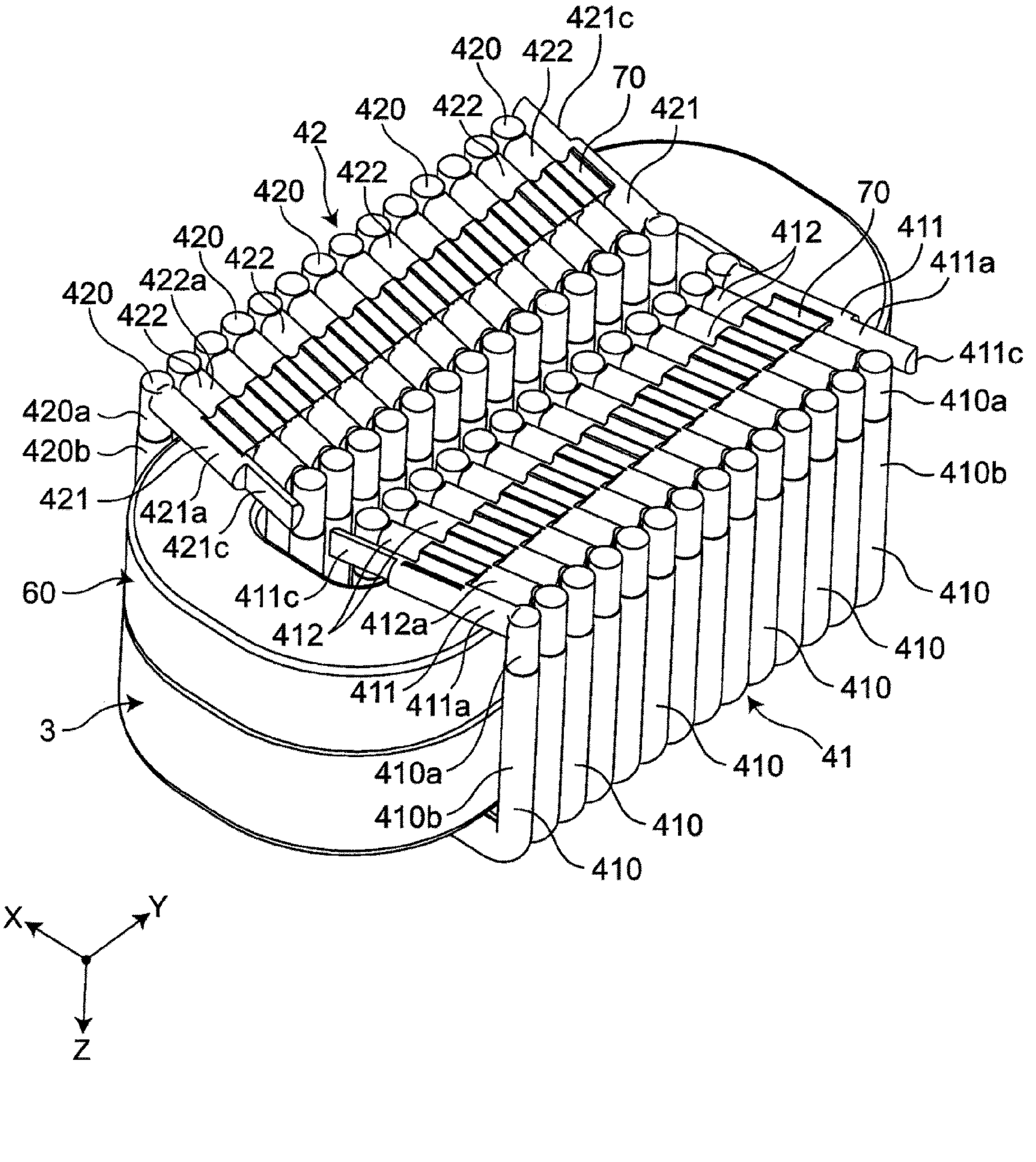
FIG. 3 is a bottom perspective view illustrating the internal structure of the inductor component according to the first embodiment.
Figure 4:
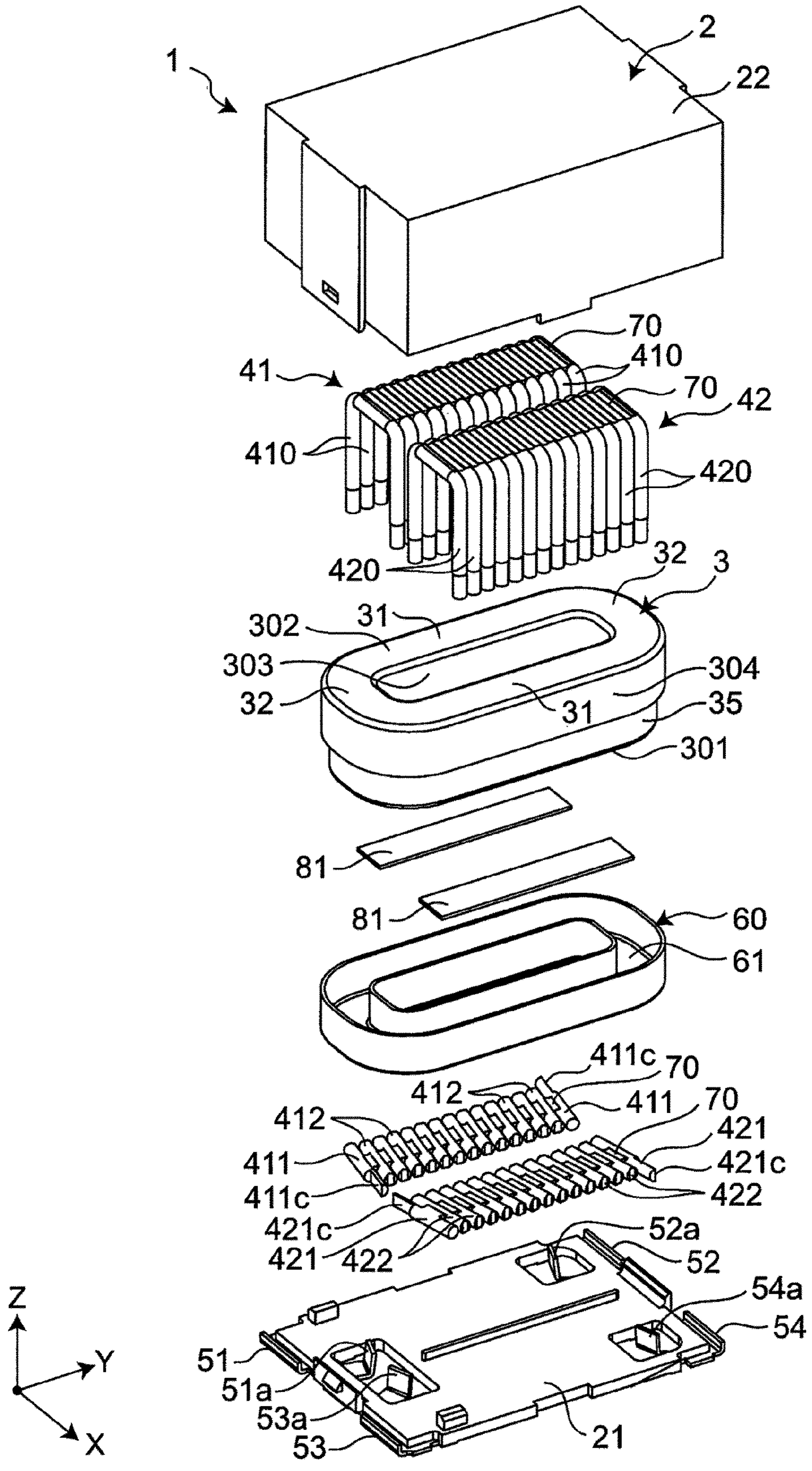
FIG. 4 is an exploded perspective view of the inductor component according to the first embodiment.
Figure 5:
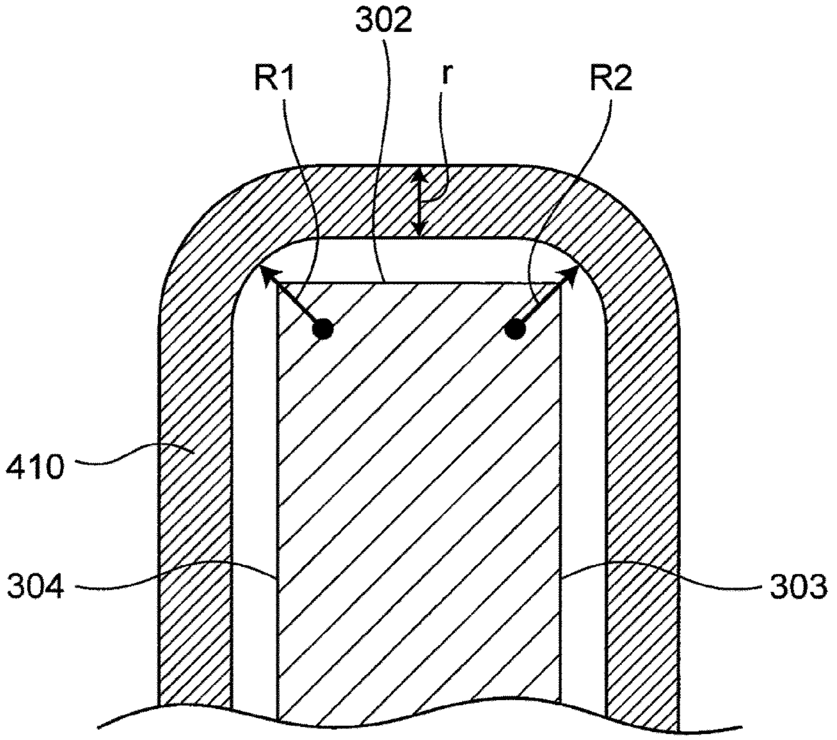
FIG. 5 is a sectional view of the inductor component according to the first embodiment.

FIG. 1 is a top perspective view of an inductor component 1 according to an embodiment of the present disclosure. FIG. 2 is a bottom perspective view of the inductor component 1. FIG. 3 is a bottom perspective view illustrating the internal structure of the inductor component 1. FIG. 4 is an exploded perspective view of the inductor component 1. FIG. 5 is a sectional view of the inductor component 1.

As illustrated in FIGS. 1 to 4, the inductor component 1 includes a casing 2, a substantially annular core 3 disposed in the casing 2, a first coil 41 and a second coil 42 wound around the core 3, and first to fourth electrode terminals 51 to 54 attached to the casing 2 and connected to the first coil 41 and the second coil 42. The inductor component 1 is, for example, a common mode choke coil.

The casing 2 includes a bottom plate portion 21 and a substantially box-shaped cover portion 22 that covers the bottom plate portion 21. The casing 2 is made of a high-strength, heat-resistant material, which is preferably a flame-retardant material. The casing 2 is made of, for example, a resin, such as polyphenylene sulfide (PPS), liquid crystal polymer (LCP), or polyphthalamide (PPA), or a ceramic. The core 3 is placed on the bottom plate portion 21 such that a central axis of the core 3 is orthogonal to the bottom plate portion 21. The central axis of the core 3 is a central axis of an inner hole in the core 3. The casing 2 (bottom plate portion 21 and cover portion 22) is substantially rectangular when viewed in the direction of the central axis of the core 3. In this embodiment, the casing 2 has a substantially elongated rectangular shape.

The short-side direction of the casing 2 when viewed in the direction of the central axis of the core 3 is defined as the X direction, and the long-side direction of the casing 2 when viewed in the direction of the central axis of the core 3 is defined as the Y direction. The height direction of the casing 2, which is the direction perpendicular to both the short-side direction and the long-side direction, is defined as the Z direction. The bottom plate portion 21 and the cover portion 22 of the casing 2 face each other in the Z direction such that the bottom plate portion 21 is at the lower side and that the cover portion 22 is at the upper side. The upper side is defined as the positive side in the Z direction, and the lower side is defined as the negative side in the Z direction. When the bottom plate portion 21 of the casing 2 is square, the length of the casing 2 in the X direction is equal to the length of the casing 2 in the Y direction.

The first to fourth electrode terminals 51 to 54 are attached to the bottom plate portion 21. The first electrode terminal 51 and the second electrode terminal 52 are disposed at two corners of the bottom plate portion 21 that face each other in the Y direction. The third electrode terminal 53 and the fourth electrode terminal 54 are disposed at the other two corners of the bottom plate portion 21 that face each other in the Y direction. The first electrode terminal 51 and the third electrode terminal 53 face each other in the X direction, and the second electrode terminal 52 and the fourth electrode terminal 54 face each other in the X direction.

The core 3 has a substantially oval shape (shape of a running track) when viewed in the direction of the central axis. The core 3 includes a pair of long portions 31 and a pair of short portions 32 when viewed in the direction of the central axis thereof. The long portions 31 extend in the direction of the major axis and face each other in the direction of the minor axis. The short portions 32 extend in the direction of the minor axis and face each other in the direction of the major axis. The long portions 31 are straight portions that extend in the direction of the major axis of the core 3. The short portions 32 are arc portions of the core 3 other than the long portions 31. The core 3 may instead have a substantially elongated rectangular shape or a substantially elliptical shape when viewed in the direction of the central axis thereof.

The core 3 is composed of, for example, a ceramic core made of ferrite or the like, or a magnetic core formed by molding iron-based powder or made of nanocrystalline foil. The core 3 has a first end face 301 and a second end face 302 that face each other in the direction of the central axis, an inner peripheral face 303, and an outer peripheral face 304. The first end face 301 is the bottom end face of the core 3, and faces the inner face of the bottom plate portion 21. In other words, the bottom plate portion 21 is disposed below the core 3. The second end face 302 is the top end face of the core 3, and faces the inner face of the cover portion 22. The core 3 is placed in the casing 2 such that the direction of the major axis of the core 3 coincides with the Y direction.

In this embodiment, the first end face 301 corresponds to a first face described in the claims, the inner peripheral face 303 to a second face described in the claims, and the outer peripheral face 304 to a third face described in the claims.

The core 3 has a substantially rectangular cross section along a plane orthogonal to the circumferential direction when viewed in the direction of the central axis. The first end face 301 and the second end face 302 are perpendicular to the direction of the central axis of the core 3. The inner peripheral face 303 and the outer peripheral face 304 are parallel to the direction of the central axis of the core 3. In this specification, the term "perpendicular" does not necessarily mean a perfectly perpendicular state, and also covers a substantially perpendicular state. In addition, the term "parallel" does not necessarily mean a perfectly parallel state, and also covers a substantially parallel state.

A lower portion of the core 3 is covered by an insulating member 60. In other words, the core 3 is partially covered by the insulating member 60, but is not entirely covered by the insulating member 60.

The insulating member 60 may be made of, for example, a super engineering plastic material, such as LCP, PPA, or PPS. In such a case, the heat resistance, insulating properties, and machinability of the insulating member 60 can be improved.

The insulating member 60 has a substantially annular recess 61 that is formed in a substantially annular shape and that covers the lower portion of the core 3. More specifically, the insulating member 60 covers the first end face 301, a portion of the inner peripheral face 303, and a portion of the outer peripheral face 304 of the core 3. Thus, the insulating member 60 can be attached to the core 3 by fitting the lower portion of the core 3 to the substantially annular recess 61 in the insulating member 60.

The core 3 has a fitting recess 35 to which the insulating member 60 is fitted. The fitting recess 35 opens in the first end face 301, the outer peripheral face 304, and the inner peripheral face 303 of the core 3. The width of the first end face 301 of the core 3 is less than the width of the second end face 302 of the core 3. An outer peripheral portion of the insulating member 60 is fitted to the fitting recess 35 of the core 3, so that the width of the insulating member 60 is not excessively greater than the width of the second end face 302 of the core 3. In addition, the insulating member 60 can be easily attached, and displacement of the insulating member 60 may be prevented.

A plurality of buffer members 81 are provided between the insulating member 60 and the core 3. The buffer members 81 are disposed between the insulating member 60 and the long portions 31 of the core 3. In the present embodiment, since the buffer members 81 are provided, the core 3 is not directly in contact with the first coil 41 or the second coil 42.

The first coil 41 is wound around the core 3 and the insulating member 60 in the region between the first electrode terminal 51 and the second electrode terminal 52. One end of the first coil 41 is connected to the first electrode terminal 51. The other end of the first coil 41 is connected to the second electrode terminal 52.

The second coil 42 is wound around the core 3 and the insulating member 60 in the region between the third electrode terminal 53 and the fourth electrode terminal 54. One end of the second coil 42 is connected to the third electrode terminal 53. The other end of the second coil 42 is connected to the fourth electrode terminal 54.

The first coil 41 and the second coil 42 are wound along the direction of the major axis. More specifically, the first coil 41 is wound around one long portion 31 of the core 3, and the second coil 42 is wound around the other long portion 31 of the core 3. The winding axis of the first coil 41 and the winding axis of the second coil 42 are parallel to each other. The first coil 41 and the second coil 42 are symmetrical about the major axis of the core 3.

The number of turns in the first coil 41 is equal to the number of turns in the second coil 42. The winding direction in which the first coil 41 is wound around the core 3 is opposite to the winding direction in which the second coil 42 is wound around the core 3. In other words, the winding direction of the first coil 41, which is the direction from the first electrode terminal 51 to the second electrode terminal 52, is opposite to the winding direction of the second coil 42, which is the direction from the third electrode terminal 53 to the fourth electrode terminal 54.

Common mode currents flow through the first coil 41 from the first electrode terminal 51 to the second electrode terminal 52 and through the second coil 42 from the third electrode terminal 53 to the fourth electrode terminal 54. In other words, the first to fourth electrode terminals 51 to 54 are connected so that the common mode currents flow in the same direction. When a common mode current flows through the first coil 41, a first magnetic flux is generated in the core 3 by the first coil 41. When a common mode current flows through the second coil 42, a second magnetic flux is generated in the core 3 in a direction such that the first magnetic flux and the second magnetic flux enhance each other in the core 3. Thus, the first coil 41, the core 3, the second coil 42, and the core 3 function as an inductance component, and noise is removed from the common mode currents.

The first coil 41 is formed by connecting a plurality of pin members by welding, for example, laser welding or spot welding. FIG. 3 does not illustrate a state in which the pin members are actually welded together, but illustrates a state in which the pin members are assembled.

The pin members are not printed wires or conductive wires, but are substantially rod-shaped members. The pin members are rigid, and are more difficult to bend than conductive wires used to connect electronic component modules. More specifically, in a cross section orthogonal to the circumferential direction of the core 3, the pin members have lengths shorter than the length of the outer circumference of the core 3 along the first end face 301, the second end face 302, the inner peripheral face 303, and the outer peripheral face 304. In addition, the pin members are highly rigid. Therefore, the pin members are difficult to bend.

The pin members include bent pin members 410 that are bent substantially in a U shape and straight pin members 411 and 412 that extend substantially straight.

The first coil 41 includes one of the first straight pin members 411 disposed at one end (one first straight pin member 411), the bent pin members 410 and the second straight pin members 412 forming pairs, and the first straight pin member 411 disposed at the other end (other first straight pin member 411), which are arranged in that order from the one end to the other end. The first straight pin members 411 and the second straight pin members 412 have different lengths. The spring index of each bent pin member 410 will now be described. Referring to FIG. 5, when the bent pin member 410 is arranged to extend along the second end face 302, the inner peripheral face 303, and the outer peripheral face 304 of the core 3, the bent pin member 410 has a spring index Ks of less than about 3.6 for each of a radius of curvature R1 of the bent pin member 410 at a corner on the outer peripheral face 304 of the core 3 and a radius of curvature R2 of the bent pin member 410 at a corner on the inner peripheral face 303 of the core 3. The spring index Ks can be expressed as follows: radius of curvature R1, R2 of bent pin member/outer diameter r of bent pin member. Thus, each bent pin member 410 is highly rigid and difficult to bend.

The bent pin members 410 and the second straight pin members 412 are alternately connected to each other by welding, for example, laser welding or spot welding. One end of each bent pin member 410 is connect to one end of one second straight pin member 412, and the other end of this second straight pin member 412 is connected to one end of another bent pin member 410. This process is repeated to connect the bent pin members 410 and the second straight pin members 412 to each other, and the bent pin members 410 and the second straight pin members 412 in the connected state are arranged in a substantially helical shape around the core 3. Thus, one of the bent pin members 410 and one of the second straight pin members 412 that form a pair constitute a single turn.

The bent pin members 410 extend parallel to the second end face 302, the inner peripheral face 303, and the outer peripheral face 304 of the core 3. The second straight pin members 412 extend parallel to the first end face 301 of the core 3. The first straight pin members 411 extend parallel to the first end face 301 of the core 3.

The bent pin members 410 in adjacent turns are fixed to each other by an adhesive member 70. Accordingly, the bent pin members 410 can be stably attached to the core 3. Similarly, adjacent ones of the first and second straight pin members 411 and 412 are fixed to each other by the adhesive member 70, and adjacent ones of the second straight pin members 412 are fixed to each other by the adhesive member 70. Accordingly, the first straight pin members 411 and the second straight pin members 412 can be stably attached to the core 3.

The first electrode terminal 51 is connected to the one first straight pin member 411, which is connected to one end of the bent pin member 410 in a turn adjacent thereto. The one first straight pin member 411 includes an attachment lug 411*c*. The first electrode terminal 51 includes an attachment portion 51*a* that extends into the casing 2. The attachment lug 411*c* of the one first straight pin member 411 is connected to the attachment portion 51*a* of the first electrode terminal 51.

The second electrode terminal 52 is connected to the other first straight pin member 411, which is connected to one end of the bent pin member 410 in a turn adjacent thereto. The other first straight pin member 411 includes an attachment lug 411*c* connected to an attachment portion 52*a* of the second electrode terminal 52.

Similar to the first coil 41, the second coil 42 also includes a plurality of pin members. More specifically, the second coil 42 includes one of the first straight pin members 421 disposed at one end (one first straight pin member 421), the bent pin members 420 and the second straight pin members 422 forming pairs, and the first straight pin member 421 disposed at the other end (other first straight pin member 421), which are arranged in that order from the one end to the other end. The bent pin members 420 and the second straight pin members 422 are alternately connected to each other and arranged to be wound around the core 3. In other words, the bent pin members 420 and the second straight pin members 422 are connected together, and the bent pin members 420 and the second straight pin members 422 in the connected state are helically wound around the core 3.

The third electrode terminal 53 is connected to the one first straight pin member 421, which is connected to one end of the bent pin member 420 in a turn adjacent thereto. The one first straight pin member 421 includes an attachment lug 421*c* connected to an attachment portion 53*a* of the third electrode terminal 53.

The fourth electrode terminal 54 is connected to the other first straight pin member 421, which is connected to one end of the bent pin member 420 in a turn adjacent thereto. The other first straight pin member 421 includes an attachment lug 421*c* connected to an attachment portion 54*a* of the fourth electrode terminal 54.

As illustrated in FIG. 3, the first coil 41 and the second coil 42 (pin members 410 to 412 and 420 to 422) each include conductor portions and coverings that cover the conductor portions. The conductor portions are, for example, copper wires, and the coverings are made of, for example, a polyamide-imide resin. The coverings have a thickness of, for example, 0.02 to 0.04 mm.

The first straight pin members 411 and 421 are respectively composed of conductor portions 411*a* and 421*a* without coverings. The second straight pin members 412 and 422 are respectively composed of conductor portions 412*a* and 422*a* without coverings. The bent pin members 410 and 420 are respectively composed of conductor portions 410*a* and 420*a* and coverings 410*b* and 420*b*.

The conductor portions 410*a* and 420*a* are exposed and not covered by the coverings 410*b* and 420*b* at one and the other ends of each of the bent pin members 410 and 420. The first straight pin members 411 and 421, the second straight pin members 412 and 422, and the bent pin members 410 and 420 are welded to each other in regions where the conductor portions 411*a*, 421*a*, 412*a*, 422*a*, 410*a*, and 420*a* are exposed.

Figure 6:
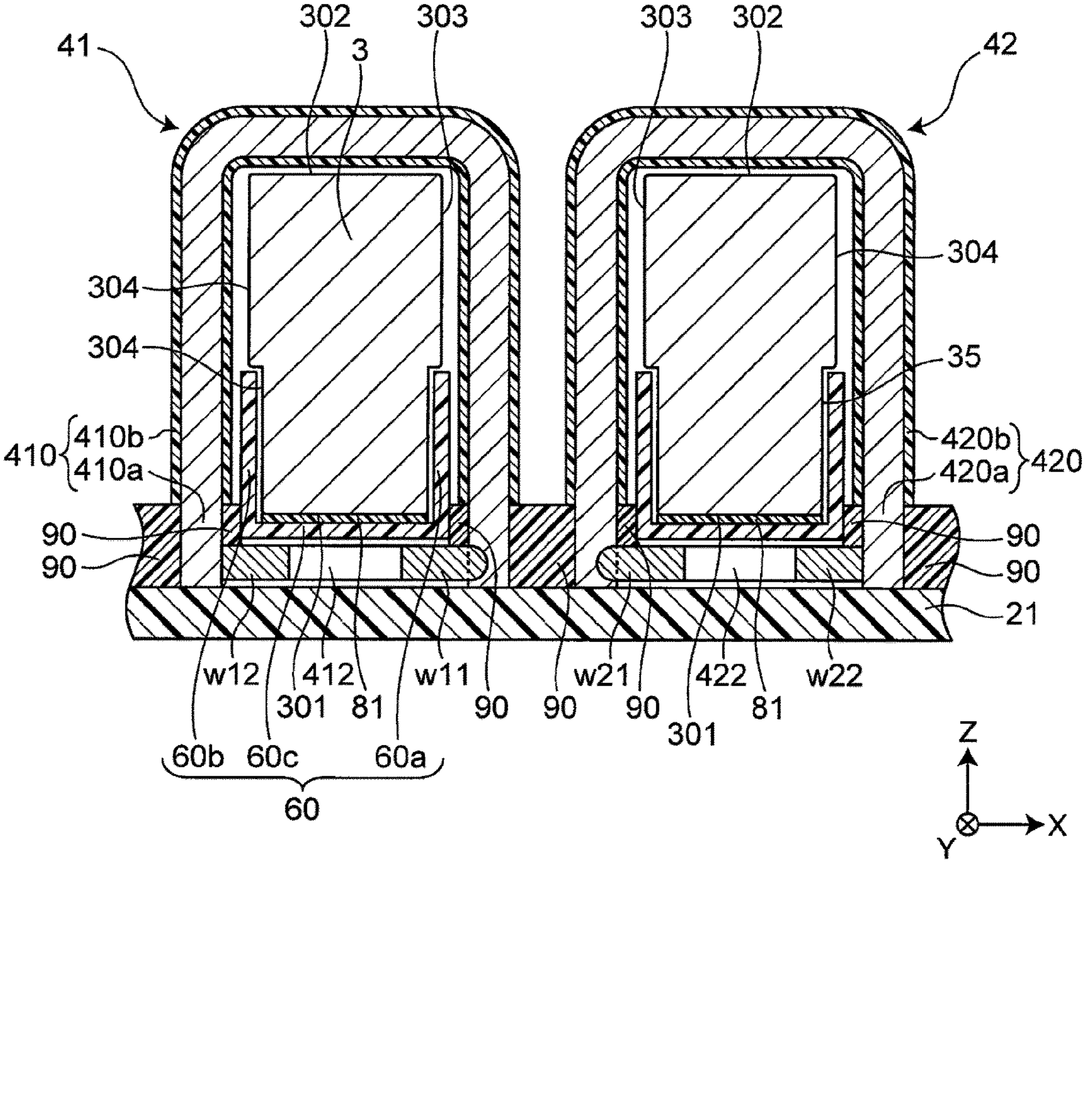
FIG. 6 is a sectional view of the inductor component according to the first embodiment.
Figure 7:
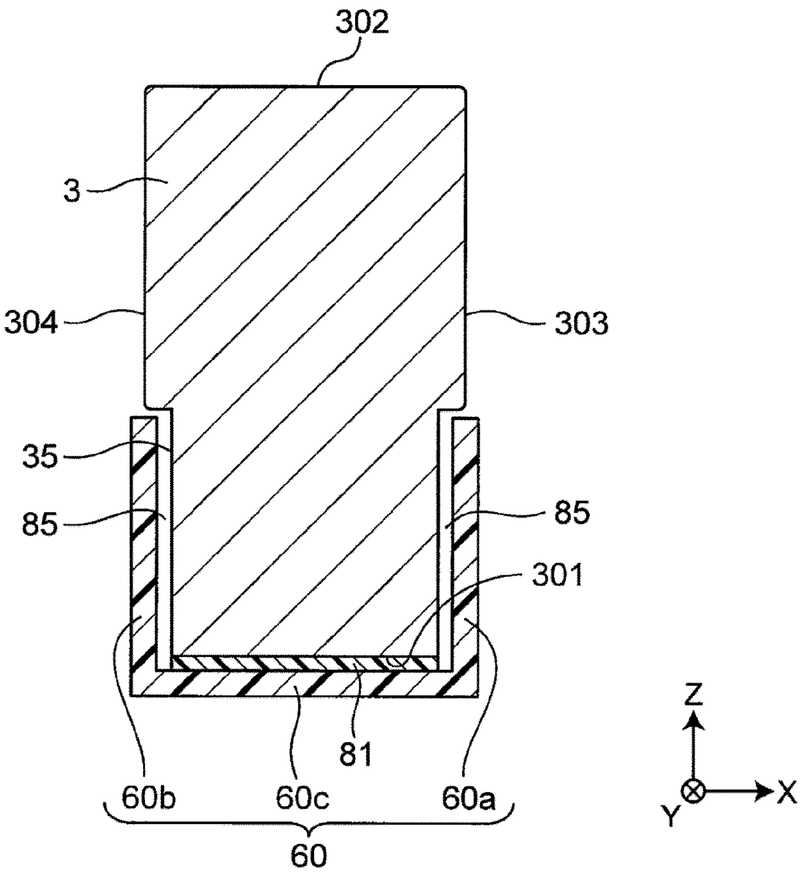
FIG. 7 is a schematic enlarged view of FIG. 6.
Figure 8:
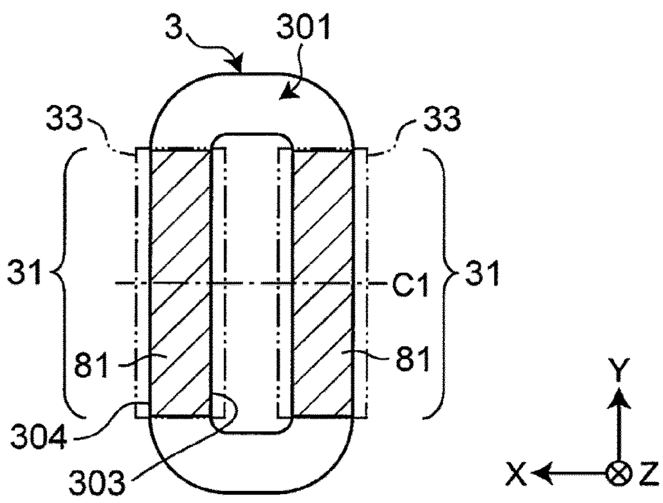
FIG. 8 is a plan view illustrating a first end face of a core and buffer members included in the inductor component according to the first embodiment.

FIG. 6 is a sectional view of the inductor component 1 along an XZ plane passing through the center of the inductor component 1 in the Y direction. FIG. 7 is a schematic enlarged view of FIG. 6, illustrating the core 3, one of the buffer members 81, and the insulating member 60. FIG. 8 is a plan view illustrating the first end face 301 of the core 3 and the buffer members 81.

As illustrated in FIG. 6, the first coil 41 is structured such that end portions of adjacent ones of the pin members are welded to each other to form a welded portion. The welded portion is a portion that has been temporarily melted during welding and then solidified. Specifically, the first coil 41 includes first welded portions w11 and second welded portions w12. More specifically, adjacent turns of the first coil 41 are configured such that the second straight pin member 412 and the bent pin member 410 in one turn form a first welded portion w11 in which one end of the conductor portion 412*a* of the second straight pin member 412 is welded to the conductor portion 410*a* of the bent pin member 410, and that the other end of the conductor portion 412*a* of the second straight pin member 412 is welded to the conductor portion 410*a* of the bent pin member 410 in the other turn to form a second welded portion w12. Although the first welded portion w11 and the second welded portion w12 illustrated in FIG. 6 have substantially linear shapes, the shapes thereof is not limited to this.

Each first welded portion will is positioned above the first end face 301 of the core 3. The arrangement in which each first welded portion w11 is positioned above the first end face 301 means that the first welded portion w11 is at least partially positioned above the first end face 301. The first welded portion w11 may be in direct contact with the first end face 301 of the core 3, or be spaced from the first end face 301 of the core 3 instead of being in direct contact therewith.

FIG. 6 illustrates the configuration in which the first welded portion w11 is positioned above the first end face 301. However, the first welded portion w11 may instead be positioned above the inner peripheral face 303 of the core 3, or above the first end face 301 and the inner peripheral face 303 of the core 3.

The arrangement in which the first welded portion w11 is positioned above the inner peripheral face 303, for example, means that the first welded portion w11 is at least partially positioned above the inner peripheral face 303. When an object is described as being positioned above the inner peripheral face 303, the object is on or near the surface of the inner peripheral face 303 irrespective of whether or not the object is in contact with the inner peripheral face 303 and irrespective of the vertical positional relationship in the drawings. The definition of the expression "positioned above" also applies to faces other than the inner peripheral face 303.

The first welded portion w11 may be positioned above the first end face 301 so as to face a first corner portion between the first end face 301 and the inner peripheral face 303 of the core 3, above the inner peripheral face 303 so as to face the first corner portion, or above the first end face 301 and the inner peripheral face 303 so as to face the first corner portion. In another embodiment, the first welded portion w11 may be positioned such that the first welded portion w11 faces only the first corner portion between the first end face 301 and the inner peripheral face 303 of the core 3. When the first corner portion is a curve on a cross section orthogonal to the circumferential direction of the core 3, the first corner portion is provided between the first end face 301 and the inner peripheral face 303 that are flat. When the first corner portion is a point on a cross section orthogonal to the circumferential direction of the core 3, the first corner portion is the intersection between the first end face 301 and the inner peripheral face 303 that are flat.

Each second welded portion w12 is positioned above the first end face 301 of the core 3. The arrangement in which each second welded portion w12 is positioned above the first end face 301 means that the second welded portion w12 is at least partially positioned above the first end face 301.

FIG. 6 illustrates the configuration in which the second welded portion w12 is positioned above the first end face 301. However, the second welded portion w12 may instead be positioned above the outer peripheral face 304 of the core 3, or above the first end face 301 and the outer peripheral face 304 of the core 3. The arrangement in which the second welded portion w12 is positioned above the outer peripheral face 304 means that the second welded portion w12 is at least partially positioned above the outer peripheral face 304.

In another embodiment, the second welded portion w12 may be positioned such that the second welded portion w12 faces only a second corner portion between the first end face 301 and the outer peripheral face 304 of the core 3.

Although FIG. 6 illustrates a turn of the first coil 41 composed of the second straight pin member 412 and the bent pin member 410, a turn composed of one of the first straight pin members 411 and one of the bent pin members 410 has a similar structure. More specifically, the conductor portion 411*a* of each first straight pin member 411 is welded to the conductor portion 410*a* of the bent pin member 410 connected thereto to form the first welded portion w11 or the second welded portion w12.

The second coil 42 includes first welded portions w21 and second welded portions w22. Similar to the first coil 41, adjacent turns of the second coil 42 are configured such that the second straight pin member 422 and the bent pin member 420 in one turn form a first welded portion w21 in which one end of the conductor portion 422*a* of the second straight pin member 422 is welded to the conductor portion 420*a* of the bent pin member 420, and that the other end of the conductor portion 422*a* of the second straight pin member 422 is welded to the conductor portion 420*a* of the bent pin member 420 in the other turn to form a second welded portion w22. In addition, the conductor portion 421*a* of each first straight pin member 421 is welded to the conductor portion 420*a* of the bent pin member 420 connected thereto to form the first welded portion w21 or the second welded portion w22. The first welded portions w21 and the second welded portions w22 of the second coil 42 have structures similar to those of the first welded portions w11 and the second welded portions w21 of the first coil 41, and description thereof is thus omitted.

The insulating member 60 is disposed between the core 3 and the welded portions, and covers a portion of the core 3.

According to the related art, for example, according to Japanese Unexamined Patent Application Publication No. 9-148141, a casing is provided to cover the entire body of a core. According to Japanese Unexamined Patent Application Publication No. 9-148141, sheets are disposed between the core and the casing (more specifically, above and below the core in FIG. 1 of Japanese Unexamined Patent Application Publication No. 9-148141) to prevent the core that vibrates from coming into contact with the casing. However, in this configuration, the cross-sectional area of the core cannot be increased. Accordingly, the inductance of the inductor component cannot be increased.

In contrast, the insulating member 60 is provided only on a portion of the core 3. Accordingly, the core 3 can be formed such that the cross-sectional area thereof is greater than when the entire external surface of the core is covered with an insulating member. Thus, according to the present embodiment, the inductance of the inductor component 1 can be increased. In addition, according to the present embodiment, the insulating member 60 is only required to be provided on a portion of the core 3. Therefore, the insulating member 60 may be provided only in a region where the insulating member 60 is required (space between the core 3 and the welded portions). When the insulating member 60 is disposed between the core 3 and all of the welded portions, the core 3 can be reliably insulated from the welded portions.

The insulating member 60 is provided along the first end face 301, a portion of the inner peripheral face 303, and a portion of the outer peripheral face 304 of the core 3. In other words, the insulating member 60 is provided to cover the first end face 301, a portion of the inner peripheral face 303, and a portion of the outer peripheral face 304 of the core 3. Thus, the core 3 and the first coil 41 can be reliably insulated from each other. More specifically, the insulating member 60 covers the first corner portion between the first end face 301 and the inner peripheral face 303 and the second corner portion between the first end face 301 and the outer peripheral face 304. The insulating member 60 includes a first portion 60*a* provided above a portion of the inner peripheral face 303 of the core 3, a second portion 60*b* provided above a portion of the outer peripheral face 304 of the core 3, and a third portion 60*c* provided above the first end face 301 of the core 3.

Preferably, the insulating member 60 does not cover the core 3 at the second end face 302, which does not face the welded portions. Accordingly, the second end face 302 of the core 3 can be positioned closer to the first coil 41 and the second coil 42 to increase the size of the core 3, and the cross-sectional area of the core 3 along an XZ plane can be increased.

As illustrated in FIG. 7, each buffer member 81 is disposed between the core 3 and the insulating member 60. Each buffer member 81 is elastic and bonds the insulating member 60 and the core 3 to each other.

According to the related art, for example, according to Japanese Unexamined Patent Application Publication No. 9-148141, a casing is provided to cover the entire surface of a core (referred to as "magnetic core" in Japanese Unexamined Patent Application Publication No. 9-148141) to protect the core. According to Japanese Unexamined Patent Application Publication No. 9-148141, as illustrated in FIG. 1, for example, sheets are disposed above and below the core (referred to as "magnetic core" in Japanese Unexamined Patent Application Publication No. 9-148141) to prevent the core that vibrates from coming into contact with the casing and generating noise. In contrast, according to the present disclosure, the core 3 can be protected by the insulating member 60 that covers only a portion of the core 3. This is because, according to the present disclosure, the buffer members 81 bond the core 3 and the insulating member 60 to each other so that the core 3 can be protected by the insulating member 60 that covers only a portion of the core 3.

Since the buffer members 81 are elastic, stress applied to the core 3 can be reduced. Accordingly, the influence of magnetostriction can be reduced. In addition, according to the present disclosure, the core 3 can be stably positioned in the inductor component even when no sheets (buffer members) are provided above and below the core as in Japanese Unexamined Patent Application Publication No. 9-148141. In the present disclosure, the insulating member 60 covers a portion of the core 3. Therefore, the core 3 can be formed to extend into the space occupied by an insulating member when the entire body of a core is covered by the buffer member. Accordingly, the cross-sectional area of the core 3 can be increased. As a result, the inductance of the inductor component 1 can be increased. In addition, since the insulating member 60 and the core 3 are bonded to each other with the buffer members 81 interposed therebetween, the insulating member 60 can be prevented from being separated from the core 3 due to vibration or an impact.

Here, the buffer members that are elastic mean buffer members made of a material having a modulus of elasticity of, for example, greater than or equal to about $1\times10^3$ Pa and less than or equal to about $1\times10^9$ Pa (i.e., from about $1\times10^3$ Pa to about $1\times10^9$ Pa). When the modulus of elasticity is in the above-described range, the insulating member 60 and the core 3 can be appropriately bonded to each other with the buffer members 81 interposed therebetween, and the influence of magnetostriction can be reduced. When the modulus of elasticity is too low, the material of the buffer members 81 is soft and may break in the buffer members 81. When the modulus of elasticity is too high, the material of the buffer members 81 is hard and may cause separation at the interfaces between the core 3 and the buffer members 81. In addition, when the modulus of elasticity is too high, the influence of magnetostriction on the core 3 is increased since the core 3 is in contact with the buffer members 81.

The material of the buffer members 81 may be, for example, a urethane resin or a silicone resin. These materials have particularly appropriate elasticities and provide appropriate adhesion between the insulating member 60 and the core 3, and are therefore suitable for use in the present embodiment. A urethane resin provides particularly appropriate adhesion between the insulating member 60 and the core 3, and is therefore particularly preferred. For example, a urethane resin having a modulus of elasticity of greater than or equal to about 23 MPa may be used.

When the buffer members 81 are made of a soft resin, such as a urethane resin, the resin enters small recesses in the surface of the core 3. As a result, the contact area between the core 3 and the buffer members 81 is increased, which causes an anchoring effect that increases the adhesive strength between the core 3 and the buffer members 81. Accordingly, the buffer members 81 can be appropriately bonded to the core 3.

In addition, when the buffer members 81 are made of a soft resin, such as a urethane resin, the resin also enters small recesses in the surface of the insulating member 60. As a result, the contact area between the insulating member 60 and the buffer members 81 is increased, which causes an anchoring effect that increases the adhesive strength between the insulating member 60 and the buffer members 81. Accordingly, the buffer members 81 can be appropriately bonded to the insulating member 60. For example, the material of the insulating member 60 may be a resin having a benzene ring, such as liquid crystal polymer (LCP), and the material of the buffer members 81 may be a urethane resin. In such a case, the buffer members 81 may be more appropriately bonded to the insulating member 60 due to interactions based on intermolecular forces between the benzene ring and a C═O group in the urethane resin.

The buffer members 81 are provided in portions of the space between the core 3 and the insulating member 60, and the space between the insulating member 60 and the core 3 includes regions where the buffer members 81 are not provided (hereinafter referred to also as "void portions"). More specifically, void portions 85, which are regions where the buffer members 81 are not provided, extend over the entire space between the inner peripheral face 303 of the core 3 and the first portion 60*a* of the insulating member and the entire space between the outer peripheral face 304 of the core 3 and the second portion 60*b* of the insulating member. Accordingly, the insulating member 60 is not directly connected to the core 3. Since the void portions 85 are provided as described above, the material of the buffer members 81 can be prevented from protruding from an edge portion of the insulating member 60. If the material of the buffer members 81 protrudes from the edge portion, there is a possibility that the size of the assembly including the core 3 and the insulating member 60 will be increased. According to the above-described structure, in the present embodiment, an increase in size due to the material of the buffer members 81 can be prevented. In addition, if the material protrudes from the edge portion of the insulating member 60, there is a risk that the protruding material will interfere with the coils 41 and 42. This can also be prevented in the present embodiment. The edge portion of the insulating member 60 is located at the end at which the gap between the insulating member 60 and the core 3 opens.

The buffer members 81 are proved on the first end face 301 of the core 3. In other words, the buffer members 81 are provided only in the space between the first end face 301 of the core 3 and the third portion 60*c* of the insulating member 60. According to this structure, the material of the buffer members 81 may be reliably prevented from protruding from the space between the core 3 and the insulating member 60.

As illustrated in FIG. 8, the first end face 301 includes two long-portion end faces 33 enclosed by imaginary lines. The long-portion end faces 33 are portions of the first end face 301 at locations at which the long portions are provided. In FIG. 8, cross-hatched portions are regions in which the buffer members 81 are provided. Two buffer members 81 are provided on the first end face 301.

The buffer members 81 are provided on at least portions of the long-portion end faces 33. In the present embodiment, the buffer members 81 extend over the entire regions of the long-portion end faces 33, that is, over about 100% of the areas of the long-portion end faces 33.

When the buffer members 81 have such a shape, the insulating member 60 can be prevented from being separated from the core 3 due to vibration or an impact. In addition, when the buffer members 81 are formed by applying the material of the buffer members 81, the buffer members 81 can be formed by a linear operation. Thus, the above-described structure is advantageous when such a manufacturing method is used.

The thickness of the buffer members 81 may be, for example, greater than or equal to about 52.6 μm. In the case where the buffer members 81 have such a thickness, the buffer members 81 can be prevented from being separated from the core 3 and/or the insulating member 60 when the inductor component 1 is impacted. The thickness of the buffer members 81 may be, for example, less than or equal to about 105.1 μm. When the buffer members 81 are too thick, the cross-sectional area of the core 3 is reduced, and the inductance is reduced accordingly.

Preferably, one of the buffer members 81 is positioned to overlap the first coil 41 when viewed in the direction of the central axis of the core 3. Since the buffer members 81 are provided between the core 3 and the insulating member 60, the core 3 can be prevented from moving freely relative to the insulating member 60, and vibration of the core 3 can be reduced.

Preferably, only the buffer members 81 are provided between the insulating member 60 and the core 3. In other words, preferably, no members other than the buffer members 81 are provided between the insulating member 60 and the core 3.

The buffer members 81 have the same shape, the same thickness, and the same area.

As illustrated in FIG. 6, the inductor component 1 further includes a coating member 90 that covers portions of the first coil 41 and the second coil 42. More specifically, the coating member 90 covers the conductor portions 411*a*, 412*a*, and 410*a* that are not covered by the coverings 410*b* of the first coil 41 and the conductor portions 421*a*, 422*a*, and 420*a* that are not covered by the coverings 420*b* of the second coil 42. Namely, the coating member 90 also covers the welded portions. Thus, the coating member 90 is provided adjacent to the first end face 301 of the core 3, that is, adjacent to the bottom plate portion 21.

The buffer members 81 and the insulating member 60 are disposed adjacent to the bottom plate portion 21 of the casing 2. The core 3 is disposed such that the first end face 301 thereof faces the bottom plate portion 21. Since the buffer members 81 and the insulating member 60 are disposed adjacent to the bottom plate portion 21, the center of gravity of the inductor component 1 can be shifted toward the bottom plate portion 21, so that rocking movements of the inductor component 1 can be suppressed and stability of the inductor component 1 in the installed state can be improved.

In addition, since the coating member 90 is also disposed adjacent to the bottom plate portion 21, all of the members made of resin are provided adjacent to the bottom plate portion 21. Although heat may accumulate in the members made of resin during operation of the inductor component, heat can be easily dissipated through the bottom plate portion 21 because these members are collectively disposed adjacent to the bottom plate portion 21. In addition, displacements of the first coil 41 and the second coil 42 may be prevented by the coating member 90. In addition, since the coating member 90 is disposed adjacent to the bottom plate portion 21 together with the insulating member 60 and the buffer members 81, the center of gravity of the inductor component 1 can be shifted toward the bottom plate portion 21, so that stability of the inductor component 1 in the installed state can be further improved.

The material of the coating member 90 may be, for example, a thermosetting epoxy resin.

The coating member 90 may instead be provided at a location other than the location adjacent to the bottom plate portion 21, that is, adjacent to the first end face 301 of the coil 3, and may be disposed adjacent to, for example, the second end face 302 of the coil 3. In addition, the coating member 90 may partially cover the conductor portions 410*a* and 420*a* of the bent pin members 410 and 420 and the conductor portions 412*a* and 422*a* of the second straight pin members 412 and 422.

Although the coating member 90 and the insulating member 60 are described as different members in this specification, the coating member 90 may be omitted, and the insulating member 60 may be formed as a member that is thick enough to cover the welded portions. In other words, the insulating member 60 may additionally have a function of the coating member 90.

Method for Manufacturing Inductor Component

A method for manufacturing the inductor component 1 will now be described.

The buffer members 81 are formed on the long-portion end faces 33 of the first end face 301 of the core 3 and/or a surface of the third portion 60*c* of the insulating member 60 that faces the first end face 301 of the core 3. The buffer members 81 may be formed by supplying the material of the buffer members 81 by a non-contact method, such as application using a dispenser, screen printing, or an inkjet method. The material is supplied in a liquid state, and therefore there is a risk that the thickness thereof will vary and the desired thickness cannot be achieved. Accordingly, the material is cured while the core 3 and the insulating member 60 are retained with a certain gap provided therebetween, so that the desired thickness can be achieved. The material may be heated to accelerate curing of the material as necessary.

Subsequently, as illustrated in FIG. 3, the first coil 41 and the second coil 42 are formed around the core 3 having the insulating member 60 fitted thereto such that the winding axes thereof are parallel to each other. At least portions of the conductor portions 411*a*, 412*a*, and 410*a* of the first coil 41 that are exposed and at least portions of the conductor portions 421*a*, 422*a*, and 420*a* of the second coil 42 that are exposed are disposed adjacent to the first end face 301 of the core 3.

Subsequently, while the core 3 is oriented such that the first end face 301 thereof faces upward, the pin members of the first coil 41 are welded to each other, and the pin members of the second coil 42 are welded to each other.

Subsequently, as illustrated in FIG. 4, the core 3 and the coils 41 and 42 are attached to the bottom plate portion 21 and then covered by the cover portion 22, thereby being contained in the casing 2. Thus, the inductor component 1 is manufactured.

According to the above-described manufacturing method, the number of processes for manufacturing the inductor component 1 can be reduced, and the inductor component 1 can be more easily manufactured.

Second Embodiment

Figure 9:
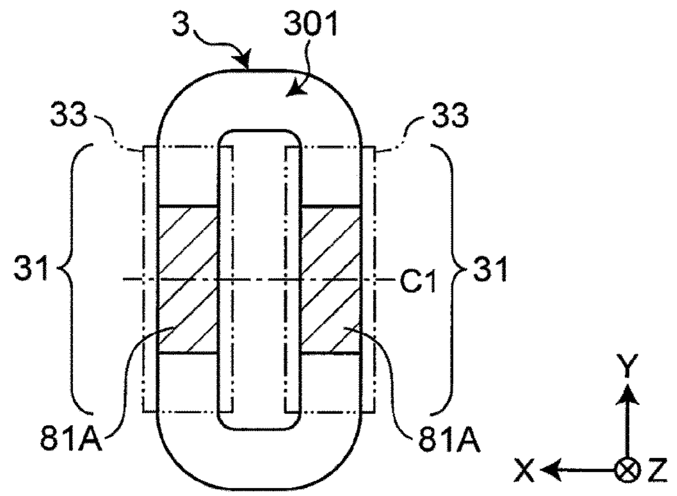
FIG. 9 is a plan view illustrating a first end face of a core and buffer members included in an inductor component according to a second embodiment of the present disclosure.

FIG. 9 illustrates a first end face 301 of a core 3 and buffer members 81A included in an inductor component 1A according to a second embodiment.

The inductor component 1A differs from the inductor component 1 of the first embodiment in the regions in which the buffer members are provided. This difference will now be described. Other components, which are the same as those in the first embodiment, are denoted by the same reference signs as those in the first embodiment, and description thereof is thus omitted.

Two buffer members 81A are provided between the insulating member 60 and the core 3. The buffer members 81A are provided on at least portions of the long-portion end faces 33, and extend over about 50% of the areas of the long-portion end faces 33 in the present embodiment. The buffer members 81A having such a shape provide reliable adhesion between the insulating member 60 and the core 3. In addition, according to the present embodiment, the cost can be reduced.

The regions in which the buffer members 81A are provided overlap a line C1 connecting the centers of the long portions 31 in the direction of the major axis. Preferably, the buffer members 81A have substantially symmetrical shapes about the line C1 connecting the centers when viewed in the direction of the central axis. When the buffer members 81A are shaped as in the present embodiment, the insulating member 60 and the core 3 can be more uniformly bonded to each other.

Third Embodiment

Figure 10:
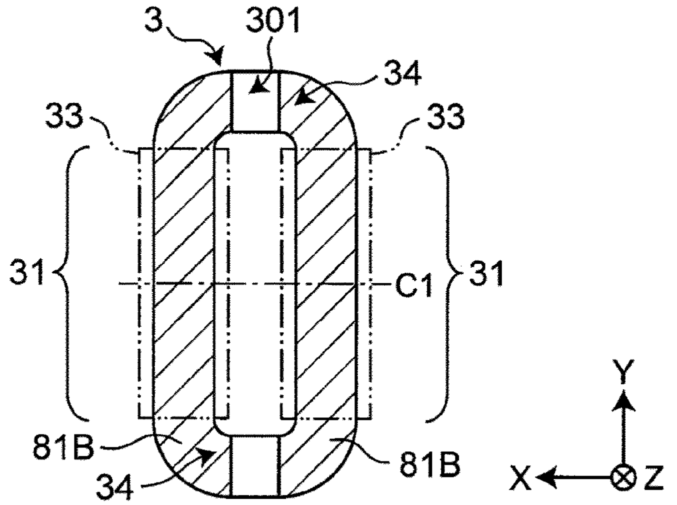
FIG. 10 is a plan view illustrating a first end face of a core and buffer members included in an inductor component according to a third embodiment of the present disclosure.

FIG. 10 is a plan view illustrating a first end face 301 of a core 3 and buffer members 81B included in an inductor component 1B according to a third embodiment.

The inductor component 1B differs from the inductor component 1 of the first embodiment in the regions in which the buffer members are provided. This difference will now be described. Other components, which are the same as those in the first embodiment, are denoted by the same reference signs as those in the first embodiment, and description thereof is thus omitted.

Referring to FIG. 10, the first end face 301 of the core 3 includes the long-portion end faces 33, which are portions enclosed by imaginary lines, and short-portion end faces 34, which are portions other than the long-portion end faces 33. The short-portion end faces 34 are portions of the first end face 301 at which the short portions are located.

The buffer members 81B are provided over the entire regions of the long-portion end faces 33 and portions of the short-portion end faces excluding the central portions when viewed in the direction of the central axis. More specifically, the buffer members 81B according to the present embodiment extend over larger regions than the buffer members 81 of the first embodiment.

According to the buffer members 81B having the above-described structure, the adhesion between the core 3 and the insulating member 60 can be improved.

In the present embodiment, the buffer members 81B are provided over the entire regions of the long-portion end faces 33 and portions of the short-portion end faces 34 excluding the central portions when viewed in the direction of the central axis. The ratio of the area of the buffer members 81B on the short-portion end faces 34 is not limited to that in the present embodiment.

Fourth Embodiment

Figure 11:
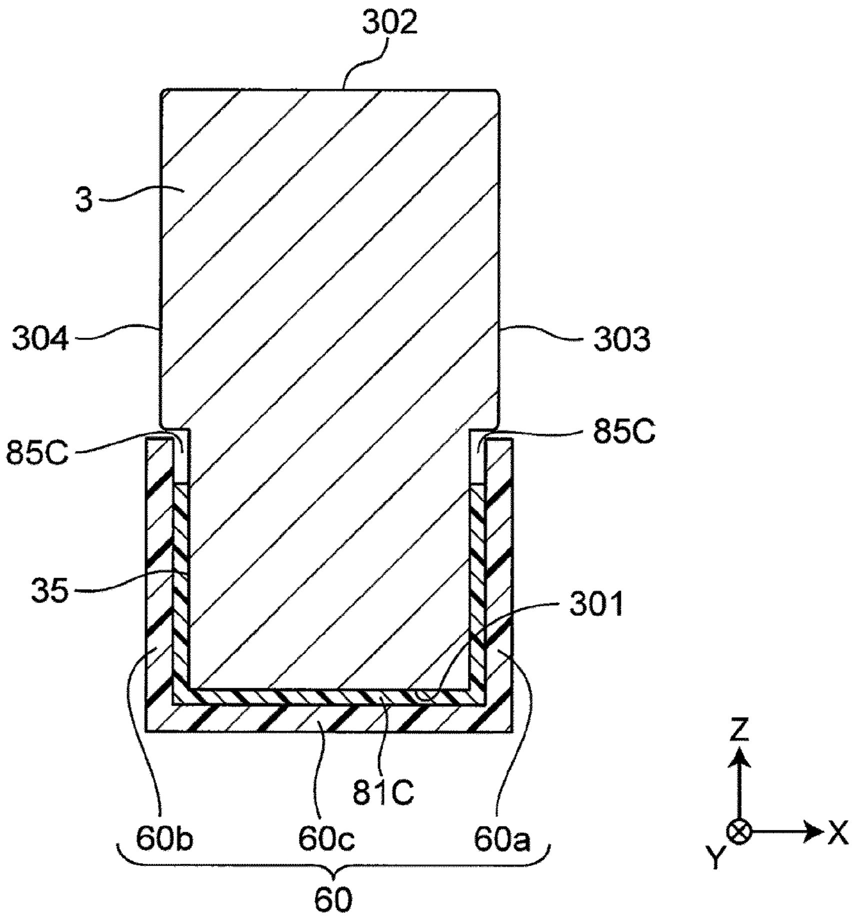
FIG. 11 is a schematic enlarged sectional view of an inductor component according to a fourth embodiment of the present disclosure.

FIG. 11 is a schematic enlarged partial view of an inductor component 1C according to a fourth embodiment along an XZ plane passing through the center of the inductor component in the Y direction.

The inductor component 1C differs from the inductor component 1 of the first embodiment in the shape of the buffer members. This difference will now be described. Other components, which are the same as those in the first embodiment, are denoted by the same reference signs as those in the first embodiment, and description thereof is thus omitted.

A buffer member 81C is provided on the first end face 301, a portion of the inner peripheral face 303, and a portion of the outer peripheral face 304 of the core 3. More specifically, the buffer member 81C is provided between the first end face 301 of the core 3 and the third portion 60*c* of the insulating member 60, between the inner peripheral face 303 of the core 3 and the first portion 60*a* of the insulating member 60, and between the outer peripheral face 304 of the core 3 and the second portion 60*b* of the insulating member 60.

Void portions 85C, which are regions where the buffer member 81C is not provided, are provided in a portion of the space between the inner peripheral face 303 of the core 3 and the first portion 60*a* of the insulating member 60 and a portion of the space between the outer peripheral face 304 of the core 3 and the second portion 60*b* of the insulating member 60. The void portions 85C are provided at an edge portion of the insulating member 60.

According to the above-described structure, the material of the buffer member 81C can be prevented from protruding from the edge portion of the insulating member 60. If the material of the buffer member 81C protrudes from the edge portion, there is a possibility that the size of the assembly including the core 3 and the insulating member 60 will be increased. According to the above-described structure, an increase in size due to the material of the buffer member 81C can be prevented. In addition, if the material protrudes from the edge portion of the insulating member 60, there is a risk that the protruding material will interfere with the coils 41 and 42. This can also be prevented in the present embodiment.

The present disclosure is not limited to the above-described embodiments, and design changes are possible within the gist of the present disclosure.

In the first to fourth embodiments, the core 3 has the fitting recess 35. In another embodiment, no fitting recess 35 is provided. In such a case, the core 3 has a substantially rectangular cross section along an XZ plane. According to this structure, the core 3 can be reliably insulated from the first coil 41 and the second coil 42. In addition, the cross-sectional area of the core 3 along an XZ plane is greater than when the entire surface of the core is covered by the insulating member.

The buffer members 81A may be provided over more than about 50% and less than about 100% (i.e., from about 50% to about 100%) of the area of the long-portion end faces 33. The buffer members 81A having such a shape provide reliable adhesion between the insulating member 60 and the core 3.

It is not necessary that the buffer members 81 be shaped as in the first to fourth embodiments as long as the buffer members 81 are provided between the first end face 301 of the core 3 and the insulating member 60. The buffer members 81 may, for example, be provided in the space between the first end face 301 of the core and the third portion 60*c* of the insulating member 60 and the space between the inner peripheral face 303 of the core and the first portion 60*a* of the insulating member. Alternatively, the buffer members 81 may be provided in the space between the first end face 301 of the core and the third portion 60*c* of the insulating member 60 and the space between the outer peripheral face 304 of the core and the second portion 60*b* of the insulating member.

In the first to fourth embodiments, the regions in which the buffer members 81 are provided on the first end face 301 of the core 3 have the same area. However, in another embodiment, these regions may have different areas.

In the first to fourth embodiments, the buffer members 81 are symmetrical about the major axis when viewed in the direction of the central axis of the core 3. However, the buffer members 81 may instead be asymmetrical.

In the first to fourth embodiments, the space between the insulating member 60 and the core 3 includes void portions, which are regions where the buffer members 81 are not provided. However, the void portions may be omitted. In other words, the buffer members 81 may be provided to occupy the entire space between the insulating member 60 and the core 3. To prevent an increase in the external size of the inductor component, the buffer members 81 preferably do not protrude from the space between the insulating member 60 and the core 3.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:
- a core having an annular shape, a first face, a second face that crosses the first face, and a third face that faces the second face and crosses the first face;
- an insulating member that covers the first face, a portion of the second face, and a portion of the third face of the core;
- a coil wound around the core and the insulating member; and
- a buffer member that is elastic, and the core and the insulating member are bonded to each other with the buffer member interposed therebetween, wherein
- the core has an oval shape when viewed in a direction of a central axis of the core,
- the core includes a pair of long portions that extend in a direction of a major axis and face each other in a direction of a minor axis when viewed in the direction of the central axis of the core,
- the core has end faces that face each other in the direction of the central axis, and
- the buffer member is provided on at least a portion of long-portion end faces, which are portions of one of the end faces at locations at which the long portions are provided.

2. The inductor component according to claim 1, further comprising:
- a bottom plate portion, wherein
- the core is disposed such that the first face of the core faces the bottom plate portion, and
- the insulating member and the buffer member are disposed at the bottom plate portion side.

3. The inductor component according to claim 1, wherein
- the buffer member is provided in a portion of a space between the insulating member and the core, and
- the space between the insulating member and the core includes a region in which the buffer member is absent.

4. The inductor component according to claim 3, wherein
- the region in which the buffer member is absent is provided at an edge portion of the insulating member.

5. The inductor component according to claim 4, wherein
- the buffer member is provided only in a space between the first face and the insulating member.

6. The inductor component according to claim 4, further comprising:
- a bottom plate portion, wherein
- the core is disposed such that the first face of the core faces the bottom plate portion, and
- the insulating member and the buffer member are disposed at the bottom plate portion side.

7. The inductor component according to claim 3, wherein
- the buffer member is provided only in a space between the first face and the insulating member.

8. The inductor component according to claim 7, further comprising:
- a bottom plate portion, wherein
- the core is disposed such that the first face of the core faces the bottom plate portion, and
- the insulating member and the buffer member are disposed at the bottom plate portion side.

9. The inductor component according to claim 3, further comprising:
- a bottom plate portion, wherein
- the core is disposed such that the first face of the core faces the bottom plate portion, and
- the insulating member and the buffer member are disposed at the bottom plate portion side.

10. The inductor component according to claim 1, wherein
- the buffer member is provided only in a space between the first face and the insulating member.

11. The inductor component according to claim 10, further comprising:
- a bottom plate portion, wherein
- the core is disposed such that the first face of the core faces the bottom plate portion, and the insulating member and the buffer member are disposed at the bottom plate portion side.

12. The inductor component according to claim 1, wherein the buffer member is present from 50% to 100% of an area of each of the long-portion end faces.

13. The inductor component according to claim 12, wherein the buffer member overlaps a line connecting centers of the long portions in the direction of the major axis on at least one of the long portions when viewed in the direction of the central axis of the core.

14. The inductor component according to claim 12, further comprising:

a bottom plate portion, wherein the core is disposed such that the first face of the core faces the bottom plate portion, and the insulating member and the buffer member are disposed at the bottom plate portion side.

15. The inductor component according to claim 1, wherein the buffer member overlaps a line connecting centers of the long portions in the direction of the major axis on at least one of the long portions when viewed in the direction of the central axis of the core.

16. The inductor component according to claim 15, further comprising:

a bottom plate portion, wherein the core is disposed such that the first face of the core faces the bottom plate portion, and the insulating member and the buffer member are disposed at the bottom plate portion side.

* * * * *